US012751451B2

(12) United States Patent
O et al.

(10) Patent No.: US 12,751,451 B2
(45) **Date of Patent: *Oct. 6, 2026**

(54) LAUNDERABLE BACTERICIDAL AND VIRUCIDAL FABRIC FINISH

(71) Applicant: Nano and Advanced Materials Institute Limited, Hong Kong (HK)

(72) Inventors: Wing Nien Wylie O, Hong Kong (HK); Tsz Hin Yui, Hong Kong (HK); Chi Yin Leung, Hong Kong (HK); Chun Sing Leung, Hong Kong (HK); Ka Yim Yeung, Hong Kong (HK)

(73) Assignee: HONG KONG APPLIED SCIENCE AND TECHNOLOGY RESEARCH INSTITUTE COMPANY LIMITED, Hong Kong (HK)

( * ) Notice: Subject to any disclaimer, the term of this patent is extended or adjusted under 35 U.S.C. 154(b) by 347 days.

This patent is subject to a terminal disclaimer.

(21) Appl. No.: 18/509,310

(22) Filed: Nov. 15, 2023

(65) Prior Publication Data

US 2024/0180157 A1 Jun. 6, 2024

Related U.S. Application Data

(63) Continuation-in-part of application No. 17/692,193, filed on Mar. 11, 2022, now Pat. No. 11,856,953.

(Continued)

(51) Int. Cl.
*A01N 43/16* (2006.01)
*A01N 25/34* (2006.01)

(Continued)

(52) U.S. Cl.
CPC ............. *A01N 43/16* (2013.01); *A01N 25/34* (2013.01); *A01P 1/00* (2021.08); *D06B 3/10* (2013.01);

(Continued)

(58) Field of Classification Search
None
See application file for complete search history.

(56) References Cited

U.S. PATENT DOCUMENTS

| | | | |
|---|---|---|---|
| 6,861,520 | B1 | 3/2005 | Todd et al. |
| 7,048,769 | B1 | 5/2006 | Weltrowski et al. |

(Continued)

FOREIGN PATENT DOCUMENTS

| | | | |
|---|---|---|---|
| CN | 1432085 | A | 7/2003 |
| CN | 102517774 | B | 4/2013 |

(Continued)

OTHER PUBLICATIONS

English language translation of CN 110 904 679 A, Publ. Mar. 24, 2020. (Year: 2020).*

(Continued)

*Primary Examiner* — Dominic Lazaro
(74) *Attorney, Agent, or Firm* — IDEA Intellectual Limited; Sam T. Yip

(57) ABSTRACT

A launderable bactericidal and virucidal fabric finish formulation. The first component is a bactericidal and virucidal agent represented by formula (I):

(I)

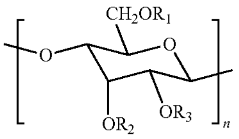

wherein n is 7; $R_1$, $R_2$, and $R_3$ are jointly or independently selected from H or one of the following groups:

(II)

$CH_2CH_2SO_3^-Na^+$;

(III)

(Continued)

Formula (II)

-continued (IV)

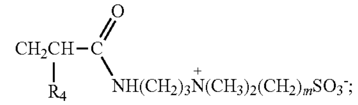

(V)

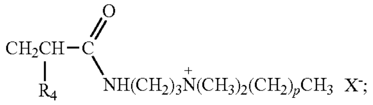

X = F, Cl, Br, I (VI)

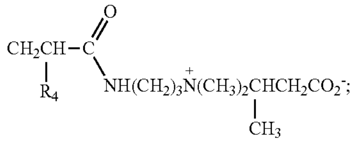

(VII)

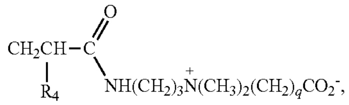

wherein $R_4$ is selected from $CH_3$ or H; m is an integer from 2 to 10; p is an integer from 9 to 15; q is an integer from 2 to 10. At least one of $R_1$, $R_2$, and $R_3$ includes a Group selected from Group (II), (III), (IV), (V), (VI) or (VII). A second component includes one or more cross-linkers and/or one or more catalysts. An optional third component includes one or more transition metal salts.

14 Claims, 3 Drawing Sheets

Related U.S. Application Data

(60) Provisional application No. 63/159,477, filed on Mar. 11, 2021.

(51) Int. Cl.

| | |
|---|---|
| ***A01P 1/00*** | (2006.01) |
| ***D06B 3/10*** | (2006.01) |
| ***D06B 21/00*** | (2006.01) |
| ***D06M 13/148*** | (2006.01) |
| ***D06M 15/03*** | (2006.01) |

(52) U.S. Cl.

CPC ........... *D06B 21/00* (2013.01); *D06M 13/148* (2013.01); *D06M 15/03* (2013.01); *D10B 2401/13* (2013.01)

(56) References Cited

U.S. PATENT DOCUMENTS

| | | | |
|---|---|---|---|
| 11,856,953 B2 * | 1/2024 | O | A01P 1/00 |
| 2006/0199785 A1 | 9/2006 | Fahmi et al. | |

FOREIGN PATENT DOCUMENTS

| | | | | |
|---|---|---|---|---|
| CN | 103554367 A | | 2/2014 | |
| CN | 110904679 A | * | 3/2020 | D06M 15/03 |
| EP | 1157156 B1 | | 4/2004 | |

OTHER PUBLICATIONS

The extended European Search Report of corresponding European Patent Application No. 22161502.4 mailed on Oct. 4, 2022.

Office Action of corresponding China Patent Application No. 202210244283.9 mailed on Mar. 15, 2023.

* cited by examiner

LAUNDERABLE BACTERICIDAL AND VIRUCIDAL FABRIC FINISH

CROSS-REFERENCE TO RELATED APPLICATION

The present application is a continuation-in-part of U.S. patent application Ser. No. 17/692,193, filed Mar. 11, 2022, which claims priority to U.S. Provisional Patent Application 63/159,477, filed 11 Mar. 2021, the disclosures of which are incorporated by reference herein.

TECHNICAL FIELD

The present invention provides a launderable bactericidal and virucidal fabric finish, the fabric incorporating thereof, and method of preparing the same.

BACKGROUND

Textiles that are subject to contact with human skin and bodily fluids are known to be carriers of microorganisms such as viruses and bacteria. Textile fibers and the warmth of the human body are both conducive to microorganism growth. For example, studies demonstrate that coronavirus SARS-CoV-1 and SARS-CoV-2 can reside on cloth for more than one day, and remain active up to one week at 22° C. Fabric and garment products, rather than acting as a physical barrier between skin and outer environment, can act as a transmission medium for viruses causing severe respiratory tract infections between humans. This is especially problematic during seasonal epidemics or even influenza pandemics.

Commercial antimicrobial fabric treatments are typically used on fabric and garment products to tackle only odor-causing bacteria and fungi. Many of these treatments are available as film forming solutions to provide physical adhesion on fiber or fabric, and yet are not durable against multiple home laundry cycles meeting industry requirements of lifestyle wear and sports apparel. Some of these treatments might change appearance of material by slow oxidation with oxygen or light of the active ingredient. Further, these treatments do not demonstrate virucidal capability.

Antiviral and antibacterial fabrics using silver, typically in the form of silver nanoparticles, are known. However, silver is a costly treatment for fabrics which limits its widespread application. Thus, there is a need for a silver-free fabric treatment. The present invention addresses this need.

Further, there is a need in the art for a launderable bactericidal and virucidal fabric finish that has outstanding activity in the form of viral reduction of viruses causing human respiratory tract infections, in addition to its deodorization capability. The finish must be durable against multiple home laundry cycles in order to meet industry requirements. Further, the finish cannot change of fabric performance such as color fastness and touch sensation.

SUMMARY OF THE INVENTION

Figure 1:
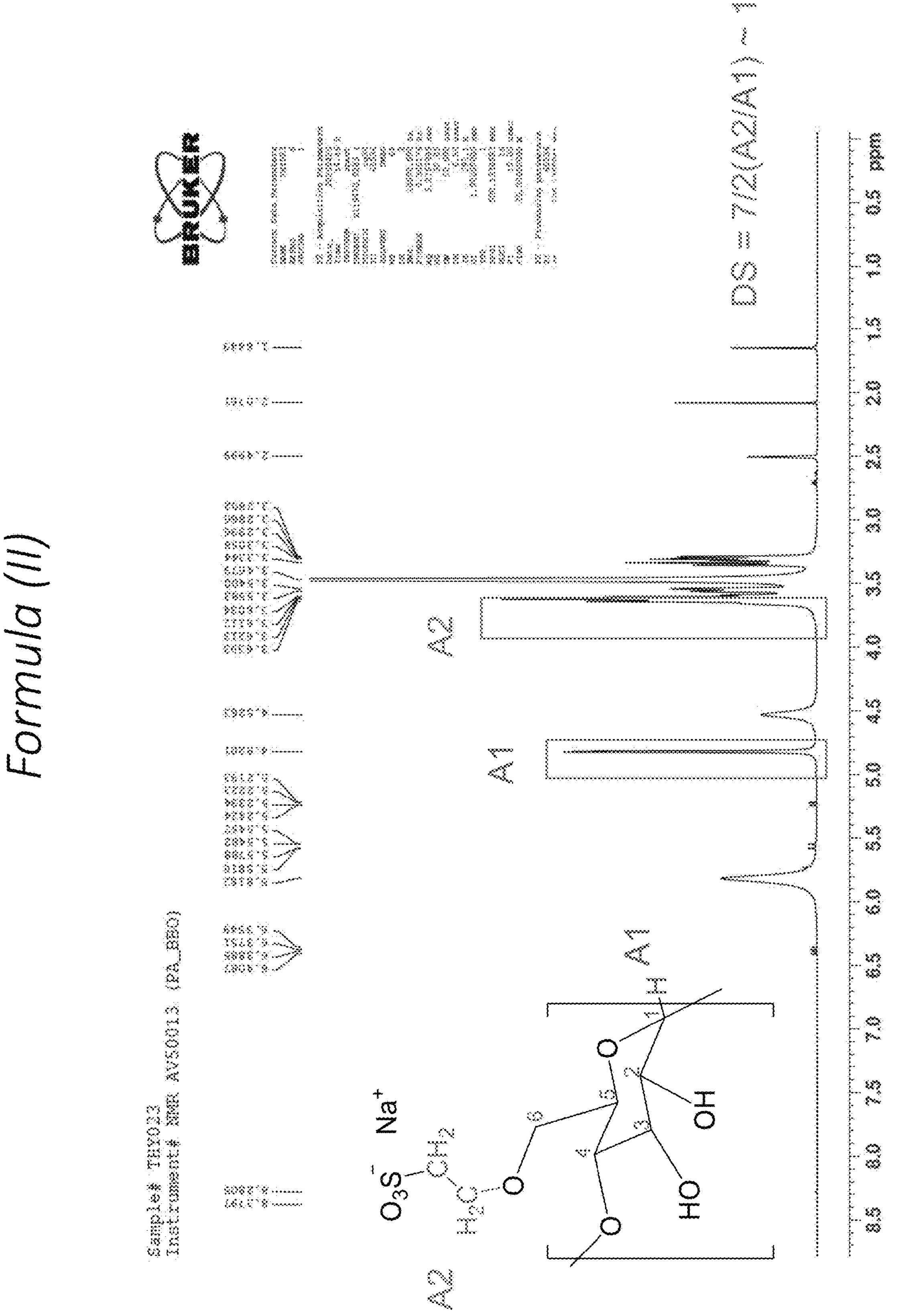
FIG. 1 shows an NMR spectrum for a compound including Formula II.

Accordingly, one aspect of the present invention provides a kit for a silver-free launderable bactericidal and virucidal fabric finish formulation. The first component is a bactericidal and virucidal agent represented by formula (I):

(I)

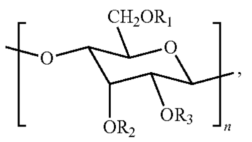

wherein n is 7; $R_1$, $R_2$, and $R_3$ are jointly or independently selected from H or one of the following groups:

(II)

$CH_2CH_2SO_3^-Na^+$;

(III)

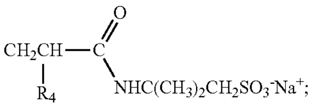

(IV)

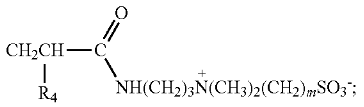

(V)

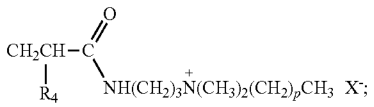

X = F, Cl, Br, I (VI)

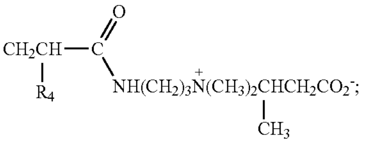

(VII)

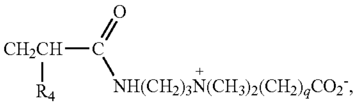

wherein $R_4$ is selected from $CH_3$ or H; m is an integer from 2 to 10; p is an integer from 9 to 15; q is an integer from 2 to 10;

wherein at least one of $R_1$, $R_2$, and $R_3$ includes a Group selected from Group (II), (III), (IV), (V), (VI) or (VII).

A second kit component includes one or more crosslinkers and/or one or more catalysts.

A third kit component includes one or more transition metal salts.

In an embodiment, the one or more crosslinkers is/are selected from citric acid, tricarballylic acid, 1,2,3,4-butanetetracarboxylic acid, 1,2,4,5-benzenetetracarboxylic acid, cis,cis,cis,cis-1,2,3,4-cyclopentanetetracarboxylic acid, 1,3,5-cyclohexanetricarboxylic acid, 1,2,3,4,5,6-cyclohexanehexacarboxylic acid, and/or ethylenediaminetetraacetic acid.

In an embodiment, the one or more catalysts is/are selected from sodium dihydrogen phosphate, sodium hydrogen phosphate, sodium phosphate, ammonium dihydrogen phosphate, sodium hypophosphite, cyanamide, dicyandiamide, sodium hydrogen cyanamide, disodium cyanamide, and/or sodium hydroxide.

In an embodiment, the one or more transition metal salts include one or more of zinc acetate, zinc acetate dihydrate, zinc gluconate, copper(II) acetate, copper(II) acetate hydrate, and copper(II) gluconate.

In an embodiment, the fabric is coated with the first and/or second part(s) of the formulation at a liquor ratio of 1:4 to 1:40, and wherein the fabric is a cotton fabric.

In an embodiment, the cotton fabric may be a jersey knit, a poplin, or a twill.

Another aspect of the present invention provides a method of preparing a launderable bactericidal and virucidal fabric. A first solution includes the first and second components in a solution. A fabric is dip-coated into the first solution to a fabric at a liquor ratio of 1:4 to 1:40. Following drying a second solution including the one or more transition metal salts is provided. The fabric is dip-coated into the second solution at a liquor ratio of 1:4 to 1:40.

In an embodiment, the liquor ratio is 1:34 to 1:40 for said dip-coating the first solution or second solution to the fabric.

In another embodiment, the liquor ratio is 1:4 to 1:5 for said dip-coating the first solution or second solution to the fabric.

In an embodiment, the fabric is coated such that it has a coating weight of approximately 6.5 to 54.0 g/$m^2$.

The fabric including the launderable bactericidal, fungicidal, virucidal fabric finish that is prepared according to the present invention is capable of reducing bacterial growth and activity from bacteria including but not limited to *Staphylococcus aureus, Klebsiella pneumonia* and *Escherichia coli*, and/or is capable of reducing viral growth and activity from viruses including but not limited to H1N1, H3N2, SARS-CoV-2 strains by at least 90%, and/or is capable of deodorizing odorants including acetic acid and isovaleric acid.

Another aspect of the present invention provides a kit for a silver-free launderable bactericidal and virucidal fabric finish formulation. The first component is a bactericidal and virucidal agent represented by formula (I):

(I)

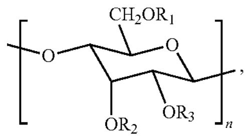

wherein n is 7; $R_1$, $R_2$, and $R_3$ are jointly or independently selected from H or one of the following groups:

(II)

$CH_2CH_2SO_3^-Na^+$;

(III)

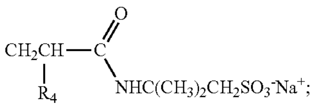

(IV)

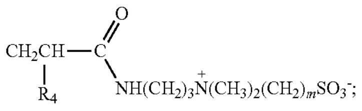

-continued (V)

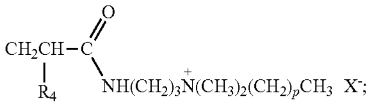

X = F, Cl, Br, I (VI)

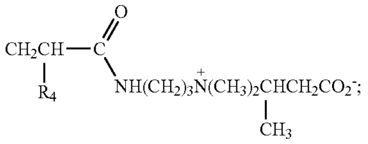

(VII)

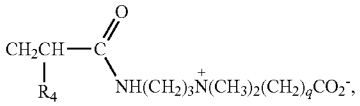

wherein $R_4$ is selected from $CH_3$ or H; m is an integer from 2 to 10; p is an integer from 9 to 15; q is an integer from 2 to 10; and wherein at least one of $R_1$, $R_2$, and $R_3$ includes a Group selected from Group (II), (III), (IV), (V), (VI) or (VII).

A second kit component includes one or more crosslinkers and/or one or more catalysts.

Another aspect of the present invention provides a method of preparing a launderable bactericidal and virucidal fabric. A first solution includes the first and second components in a solution. A fabric is dip-coated into the first solution to a fabric at a liquor ratio of 1:4 to 1:40. The dip-coated fabric is dried and/or cured.

DEFINITIONS

The terms “a” or “an” are used to include one or more than one and the term “or” is used to refer to a nonexclusive “or” unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite “Step A, Step B, Step C, Step D, and Step E” shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DETAILED DESCRIPTION

The present invention will be described in detail through the following embodiments/examples with appending drawings. It should be understood that the specific embodiments are provided for an illustrative purpose only, and should not be interpreted in a limiting manner.

The present invention relates to a launderable bactericidal and virucidal fabric finish. The finish is capable of being laundered in a conventional manner. In one aspect, the invention provides a kit for the launderable bactericidal and virucidal fabric finish formulation. Advantageously, the kit may be applied using domestic laundry equipment rather than commercial equipment. To this end, it is noted that the fabric finish using the kits of the present invention may use relatively low curing temperatures, for example, curing temperatures of 60-180° C. As a result, the kits may be directly applied to clothing and other fabrics by consumers, at home, using ordinary laundry machines.

The kit includes a first component with a bactericidal and virucidal agent represented by formula (I):

(I)

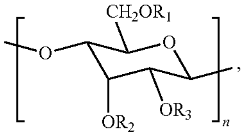

wherein n is 7; $R_1$, $R_2$, and $R_3$ are selected from H or one of the following groups:

(II)

$CH_2CH_2SO_3^-Na^+$;

(III)

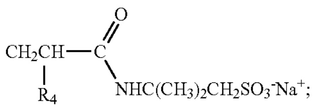

(IV)

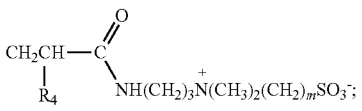

(V)

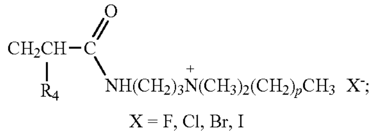

X = F, Cl, Br, I (VI)

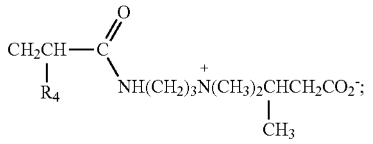

-continued (VII)

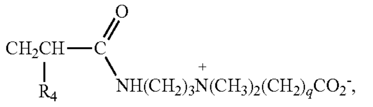

wherein $R_4$ is selected from $CH_3$ or H; m is an integer from 2 to 10; p is an integer from 9 to 15; q is an integer from 2 to 10. In formula I, at least one of wherein at least one of $R_1$, $R_2$, and $R_3$ includes a Group selected from Group (II), (III), (IV), (V), (VI) or (VII). Note that these substituents, that is, $R_1$, $R_2$, and $R_3$ may be entirely substituted by a Group (II), (III), (IV), (V), (VI) or (VII) Group or may be partially substituted by one of these six Groups. When $R_1$, $R_2$, or $R_3$ are only partially substituted by these six groups, the remaining unsubstituted $R_1$, $R_2$, and $R_3$ are hydrogen.

The kit includes a second component which may be either one or more crosslinker and/or one or more catalysts. The kit may optionally include a third component which may be one or more transition metal salts.

Formula (I) represents a beta-cyclodextrin. The functional groups of formula (II) to (VII) that are substituted jointly or independently on $R_1$, $R_2$, and/or $R_3$ on beta-cyclodextrin creates a substituted beta-cyclodextrin that is specifically engineered to create a compound that enables molecular mimicry of sialic acid on mammalian cells, therefore interacting with the spike glycoproteins on the membrane surface of a virus, and subsequently irreversibly binding onto the oligosaccharides of a virus. The presence of these glycoproteins is crucial for enveloped viruses, including influenza viruses and coronaviruses, for binding onto target host human cells, and induce subsequent viral replication leading to human infection by the virus. The irreversible binding of these spike proteins by the substituted beta-cyclodextrin that includes at least one functional groups of formula (II) to (VII) on positions $R_1$, $R_2$, and $R_3$ thus reduces the ability of these envelope viruses to attach to host human cells.

The one or more crosslinkers may be citric acid, tricarballylic acid, 1,2,3,4-butanetetracarboxylic acid, 1,2,4,5-benzenetetracarboxylic acid, cis, cis, cis, cis-1,2,3,4-cyclopentanetetracarboxylic acid, 1,3,5-cyclohexanetricarboxylic acid, 1,2,3,4,5,6-cyclohexanehexacarboxylic acid, and/or ethylenediaminetetraacetic acid. The crosslinkers serve to bind the bactericidal and virucidal agent represented by formula (I) to the fabric fibers by forming an ester linkage of the hydroxy (OH) groups from the bacterial and virucidal agent with the carboxylic acid groups on the crosslinkers at one end, and the hydroxy group from the anhydroglucose repeating unit of cellulose on fabric with the carboxylic acid groups on the crosslinkers at the other end. This ester-linkage provides durability of the fabric finished, particularly during the course of laundering such that there is no leaching of the bactericidal and virucidal agent.

The one or more catalysts may be sodium dihydrogen phosphate, sodium hydrogen phosphate, sodium phosphate, ammonium dihydrogen phosphate, sodium hypophosphite, cyanamide, dicyandiamide, sodium hydrogen cyanamide, disodium cyanamide, and/or sodium hydroxide. The catalysts facilitate an ester-linkage formation as the bactericidal and virucidal agent represented by formula (I) binds to the fabric fibers. The catalyst activates the carboxylic acid groups of the crosslinkers to form reactive acid anhydrides which subsequently react with the hydroxy groups from the anhydroglucose repeating unit of cellulose on fabric, and the hydroxy groups from those of the bactericidal and virucidal agent.

The transition metal salts may be one or more of zinc acetate, zinc acetate dihydrate, zinc gluconate, copper(II) acetate, copper(II) acetate hydrate, and copper(II) gluconate, and bind to the bactericidal and virucidal agent represented by formula (I) comprising functional groups disclosed in formula (II) to (VII). The bound copper or zinc ions are capable of inducing an oligodynamic effect on incoming bacteria and viruses at low concentrations. For instance, zinc homeostasis is disrupted when zinc ions penetrate into a virus. This impairs viral replication (i.e., virus inactivation) by binding zinc ions to the RNA in the virus. In addition, copper ions work synergistically with zinc ions to impact and enhance virucidal activity against coronavirus. In contrast, unbound metal ions lack such properties, as they are incapable of penetrating the glycoprotein membrane and interacting with the RNA structure of the virus, and therefore showing much lower virucidal capability.

It is noted that the transition metal salts set forth above do not require the presence of silver. That is, the present invention provides a silver-free fabric treatment system; silver is not required to provide the bactericidal and virucidal properties of the treated fabric.

The components of the kit described above may be easily applied to fabric by a dip-coating technique using the components in solution. A first solution is provided that includes the compound of formula (I) and also the crosslinker and/or one or more catalysts. The amount of compound of formula (I) is 2-8% by weight, the amount of crosslinker is 7-10% by weight, and the amount of catalyst is 5-9% by weight. The liquor to fabric ratio is approximately 1:4 to 1:40. An exemplary range is 1:4 to 1:5 in one embodiment and 1:34 to 1:40 in another embodiment.

A fabric is dip-coated in the first solution. The term "dip-coat" as used herein broadly relates to any technique in which a fabric is immersed in a solution with or without mechanical agitation during the dip-coating. As such, a conventional washing machine using a "soak" type of cycle may be used to apply the coating along with commercial machines for applying fabric finishes. Permitting consumers to use domestic laundry equipment at lower cure temperatures of 60-120° C. enables home application. This is important since fabrics that are subject to frequent washing may need repeated application over the lifetime of a garment or other fabric and consumers may wish to re-apply the finish.

The term "liquor ratio" in the specification represents the weight ratio of fabric to the liquid components in first or second solution of the formulation. For example, in Example 2, the liquor ratio (1:34) comes from the weight ratio of fabric to distilled water (25:830).

The term "pad" in the specification represents the removal or squeezing of water from wet fabric with pressure.

A variety of fabrics may use the fabric finish of the present invention. Such fabrics include, but are not limited to polyester-based fabrics, nylon-based fabrics, cotton fabrics, and cotton-blend fabrics. In particular, fabrics that include some cellulose fibers are particularly suited to bind with the cyclodextrin of formula. These include cotton, cotton-polyester blends, cotton-nylon blends, and cotton-spandex blends. Particular cotton-based fabrics include jersey knits, poplins, and twills.

The dip-coating may be performed at room temperature (defined as approximately 20-27° C.) or it may occur at an elevated temperature of 28-80° C. The duration of the dip-coating may range from approximately 5 to 60 minutes depending in part upon the weight and density of the fabric. After drying and/or curing the dip-coated fabric, the fabric is washed with water and then tumble dried the washed fabric for about 30 to 60 minutes at about 60 to 90° C. Drying may be by air-drying or drying at elevated temperature. For elevated temperatures, commercial or household clothes dryers may be used to perform the drying. The drying time will depend upon the weight of the fabric but typically the time is about 5 to 60 minutes at a temperature of about 60 to 180° C.

Following drying, the fabric that has been treated with the first solution is dip-coated in the second solution that includes the metal salt. The dip-coating may be performed at room temperature or it may occur at an elevated temperature of 28-80° C. The duration of the dip-coating may range from approximately 5 to 60 minutes depending in part upon the weight and density of the fabric. After drying and/or curing the dip-coated fabric, the fabric is washed with water and then tumble dried the washed fabric for about 30 to 60 minutes at about 60 to 90° C. Drying may be by air-drying or drying at elevated temperature. For elevated temperatures, commercial or household clothes dryers may be used to perform the drying. The drying time will depend upon the weight of the fabric but typically the time is about 30 to 60 minutes at a temperature of about 60 to 90° C. Optionally, the dip-coating in a metal salt solution may be repeated using a different metal salt solution.

A fabric having the launderable bactericidal and virucidal fabric finish prepared as described above has bactericidal, fungicidal, virucidal activity of at least 90% in terms of reducing bacterial or viral growth and activity from bacteria including one or more of *Staphylococcus aureus, Klebsiella pneumonia* and *Escherichia coli*, and viruses including H1N1 and H3N2, SARS-CoV-2 strains, and/or has deodorizing performance of at least 90% including one of more of acetic acid and isovaleric acid. Details of fabric testing against bacteria and viruses are set forth in the Examples, below. The coating weight of the fabric finish ranges from approximately 6.5 to approximately 54.0 g/m$^2$.

Another aspect of the present invention relates to a launderable bactericidal and virucidal fabric finish. The finish is capable of being laundered in a conventional manner. In one aspect, the invention provides a kit for the launderable bactericidal and virucidal fabric finish formulation. The kit includes a first component with a bactericidal and virucidal agent represented by formula (I):

(I)

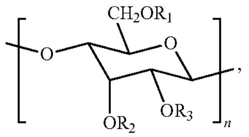

wherein n is 7; $R_1$, $R_2$, and $R_3$ are jointly or independently selected from H or one of the following groups:

(II)

$CH_2CH_2SO_3^-Na^+$;

(III)

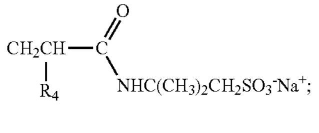

-continued (IV)

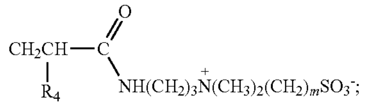

(V)

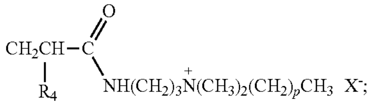

X = F, Cl, Br, I (VI)

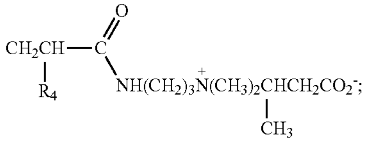

(VII)

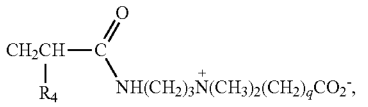

wherein $R_4$ is selected from $CH_3$ or H; m is an integer from 2 to 10; p is an integer from 9 to 15; q is an integer from 2 to 10. The kit includes a second component which may be either one or more crosslinker and/or one or more catalysts.

The components of the kit described above may be easily applied to fabric by a dip-coating technique using the components in solution. A first solution is provided that includes the compound of formula (I) and also the cross-linker and/or one or more catalysts. The amount of compound of formula (I) is 2-8% by weight, the amount of crosslinker is 7-10% by weight, and the amount of catalyst is 5-9% by weight. The liquor to fabric ratio is approximately 1:4 to 1:40. An exemplary value is 1:4 in one embodiment.

A variety of fabrics may use above fabric finish. Such fabrics include, but are not limited to polyester-based fabrics, nylon-based fabrics, cotton fabrics, and cotton-blend fabrics. In particular, fabrics that include some cellulose fibers are particularly suited to bind with the cyclodextrin of formula. These include cotton, cotton-polyester blends, cotton-nylon blends, and cotton-spandex blends. Particular cotton-based fabrics include jersey knits, poplins, and twills.

The dip-coating may be performed at room temperature (defined as approximately 20-27° C.) or it may occur at an elevated temperature of 28-80° C. The duration of the dip-coating may range from approximately 5 to 60 minutes depending in part upon the weight and density of the fabric. After drying and/or curing the dip-coated fabric, the fabric is washed with water and then tumble dried the washed fabric for about 30 to 60 minutes at about 60 to 90° C. Drying may be by air-drying or drying at elevated temperature. For elevated temperatures, commercial or household clothes dryers may be used to perform the drying. The drying time will depend upon the weight of the fabric but typically the time is about 5 to 60 minutes at a temperature of about 60 to 180° C.

EXAMPLES

Example 1—General Formulation on Cotton Fabric

Table 1 below provides an overview of the first solution of the general formulation for dip-coating a fabric in order to form a launderable bactericidal and virucidal fabric finish in the fabric.

TABLE 1

| Materials | Amount (% by weight) |
|---|---|
| Bactericidal and virucidal agent of formula (I) comprising the substituent of formula (II) and/or formula (III) | 2-8 |
| Crosslinker | 7-10 |
| Catalyst | 5-9 |
| Water/solvent | 73-86 |

Dip-Coating Procedure

1. The components in Table 1 were dissolved in distilled water at 25° C. to form the first solution.
2. A piece of cotton fabric was dip-coated using the first solution for about 5 to 60 minutes at about 25 to 80° C. at a liquor ratio of 1:4 to 1:40.
3. The wet fabric was padded and dried at 60 to 180° C. for 5 to 60 minutes.
4. The dried fabric was rinsed with water, padded, and tumble dried to remove absorbed water.
5. Zinc acetate dihydrate as a transition metal salt was dissolved in distilled water according to the amount listed in the following Table 2 to form a second solution of the formulation.

TABLE 2

| Materials | Amount (% by weight) |
|---|---|
| Zinc Acetate Dihydrate | 0.005-6 |
| Distilled Water | 94-99.995 |

6. The dried cotton fabric from step 4 was further dip-coated with the second solution for about 5 to 60 minutes at about 25° C.
7. The wet fabric was padded and dried at 60 to 180° C. for 5 to 60 minutes.
8. The fabric was rinsed with water, padded, followed by drying at about 60 to 90° C. for about 30 to 60 minutes.

The general coating weighed from 6.5 to 54.0 $g/m^2$ upon applying the finish to fabric after drying.

Example 2—Formulation 1 on Cotton Fabric—Variation of Zinc Acetate Dihydrate Table 3 provides a first solution of the formulation 1 for dip-coating cotton fabric including jersey knit

TABLE 3

| Materials | Amount (%) | Amount (g) |
|---|---|---|
| cotton fabric - jersey knit, poplin, twill | liquor ratio 1:34 | 25 |
| bactericidal and virucidal agent of formula (I) comprising the substituent of formula (II) | 2 | 20 |

TABLE 3-continued

| Materials | Amount (%) | Amount (g) |
|---|---|---|
| 1,2,3,4-butanetetracarboxylic acid | 10 | 100 |
| sodium dihydrogen phosphate | 5 | 50 |
| distilled water | 83 | 830 |

Dip-Coating Procedure

1. The components of Table 3 were dissolved in distilled water at about 25° C. to form the first solution.
2. Cotton fabric was dip-coated with the first solution at a liquor ratio of 1:34 for about 5 minutes at about 25° C.
3. The wet fabric was padded and dried at about 80° C. for about 60 minutes, followed by curing at about 180° C. for about 5 minutes.
4. The dried fabric was rinsed with water, padded, and tumble dried to remove absorbed water.
5. Zinc acetate dihydrate as a transition metal salt was dissolved in distilled water according to the amount listed in the following Table 4 to form a second solution.

TABLE 4

| Materials | Amount (%) | Amount (g) |
|---|---|---|
| cotton fabric from step 4 | liquor ratio 1:40 | 25 |
| zinc acetate dihydrate | 0.005-2 | 0.05-20 |
| distilled water | 98-99.995 | 980-999.95 |

6. The dried cotton fabric from step 4 was further dip-coated with the second solution for about 5 to 60 minutes at about 25° C.
7. The wet fabric was padded and dried at about 80° C. for about 60 minutes.
8. The dried fabric was rinsed with water, padded, and tumble dried to remove absorbed water.

The coating weighed from approximately 23.6 to 54.0 g/$m^2$ upon applying the finish to fabric after drying.

Example 3—Formulation 1 on Cotton Fabric—Use of High Concentration of Zinc Acetate Dihydrate Table 5 provides a first solution of the formulation 1 for dip-coating cotton fabric including jersey knit, poplin, and twill.

TABLE 5

| Materials | Amount (%) | Amount (g) |
|---|---|---|
| cotton fabric - jersey knit, poplin, twill | liquor ratio 1:34 | 25 |
| bactericidal and virucidal agent of formula (I) comprising the substituent of formula (II) | 2 | 20 |
| 1,2,3,4-butanetetracarboxylic acid | 10 | 100 |
| sodium dihydrogen phosphate | 5 | 50 |
| distilled water | 83 | 830 |

Dip-Coating Procedure

1. The components of Table 5 were dissolved in distilled water at about 25° C. to form the first solution.
2. Cotton fabric was dip-coated with the first solution at a liquor ratio of 1:34 for about 5 minutes at about 25° C.
3. The wet fabric was padded and dried at about 80° C. for about 60 minutes, followed by curing at about 180° C. for about 5 minutes.
4. The dried fabric was rinsed with water, padded, and tumble dried to remove absorbed water.
5. Zinc acetate dihydrate as a transition metal salt was dissolved in distilled water according to the amount listed in the following Table 6 to form a second solution of the formulation.

TABLE 6

| Materials | Amount (%) | Amount (g) |
|---|---|---|
| cotton fabric from step 4 | liquor ratio 1:38 | 25 |
| Zinc Acetate Dihydrate | 6 | 60 |
| Distilled Water | 94 | 940 |

6. The cotton fabric from step 4 was further dip-coated with the second solution at a liquor ratio of 1:38 for about 5 minutes.
7. The wet fabric was padded and dried at about 80° C. for about 60 minutes.
8. The dried fabric was rinsed with water, padded, and tumble dried to remove absorbed water.

The coating weighed from approximately 8.1 to 54.0 g/$m^2$ upon applying the finish to fabric after drying.

Example 4—Formulation 2 on Cotton Fabric

Table 7 below provides a first solution of the formulation 2 for dip-coating a cotton fabric of jersey knit.

TABLE 7

| Materials | Amount (%) | Amount (g) |
|---|---|---|
| cotton fabric - jersey knit | Liquor Ratio 1:4 | 6 |
| bactericidal and virucidal agent of formula (I) comprising the substituent of formula (II) | 2 | 0.8 |
| 1,2,3,4-butanetetracarboxylic acid | 10 | 4 |
| cyanamide (50% wt aqueous solution) | 8 (4% solid content) | 3.2 |
| ammonium dihydrogen phosphate | 5 | 2 |
| distilled water | 75 | 30 |

Dip-Coating Procedure

1. The components of Table 7 were dissolved in distilled water at about 25° C.
2. Cotton fabric of jersey knit was dip-coated with the first solution at a liquor ratio of 1:4 for about 5 minutes at about 25° C.
3. The wet fabric was padded and dried at about 80° C. for about 30 minutes.
4. The dried fabric was rinsed with water, padded, and then tumble dried to remove absorbed water.
5. Zinc acetate dihydrate as a transition metal salt was dissolved in distilled water according to the amount listed in the following Table 8 to form a second solution of the formulation.

TABLE 8

| Materials | Amount (%) | Amount (g) |
|---|---|---|
| cotton fabric from step 4 | liquor ratio 1:6 | 6 |
| zinc acetate dihydrate | 6 | 2.4 |
| distilled water | 94 | 37.6 |

6. The cotton fabric from step 4 was further dip-coated with the second solution at a liquor ratio of 1:6 for about 5 minutes.

7. The wet fabric was padded and dried at about 80° C. for about 30 minutes.

8. The dried fabric was rinsed with water, padded and then tumble dried to remove absorbed water.

The coating weighed from approximately 6.5 to 17.0 g/$m^2$ upon applying the finish to fabric after drying.

Example 5—Formulation 3 on Cotton Fabric

Table 9 below provides a first solution of the formulation 3 for dip-coating a cotton fabric of jersey knit.

TABLE 9

| Materials | Amount (%) | Amount (g) |
|---|---|---|
| cotton fabric - jersey knit | liquor ratio 1:4 | 30 |
| bactericidal and virucidal agent of formula (I) comprising the substituent of formula (II) | 2 | 3.3 |
| 1,2,3,4-butanetetracarboxylic acid | 4-10 | 6.6-16.5 |
| cyanamide (50% wt aqueous solution) | 8, 4% solid content | 13.2 |
| ammonium dihydrogen phosphate | 5 | 8.3 |
| distilled water | 69-75 | 124-134 |

Dip-Coating Procedure

1. The components of Table 9 were dissolved in distilled water at about 25° C.

2. Cotton fabric of jersey knit was dip-coated with the first solution at a liquor ratio of 1:4 for about 5 minutes at about 25° C.

3. The wet fabric was padded and dried at about 80° C. for about 60 minutes.

4. The dried fabric was rinsed with water, padded and then tumble dried to remove absorbed water.

5. Zinc acetate dihydrate as a transition metal salt was dissolved in distilled water according to the amount listed in the following Table 10 to form a second solution.

TABLE 10

| Materials | Amount (%) | Amount (g) |
|---|---|---|
| Cotton fabric from step 4 | Liquor Ratio 1:5 | 30 |
| zinc acetate dihydrate | 6 | 10 |
| distilled water | 94 | 150 |

6. The cotton fabric from step 4 was further dip-coated with the second solution at a liquor ratio of 1:5 for about 5 minutes.

7. The wet fabric was padded and dried at about 80° C. for about 30 minutes.

8. The dried fabric was rinsed with water, padded and then tumble dried to remove absorbed water.

The coating weighed from approximately 7.0 to 16.8 g/$m^2$ upon applying the finish to fabric after drying.

Example 6—Formulation 4 on Cotton Fabric

Table 11 below provides a first solution of the formulation 4 for dip-coating a cotton fabric of jersey knit.

TABLE 11

| Materials | Amount (%) | Amount (g) |
|---|---|---|
| cotton fabric - jersey knit | liquor ratio 1:4 | 72 |
| bactericidal and virucidal agent of formula (I) comprising the substituent of formula (II) | 2 | 8 |
| 1,2,3,4-butanetetracarboxylic acid | 10 | 40 |
| cyanamide (50% wt aqueous solution) | 8 (4% solid content) | 32 |
| ammonium dihydrogen phosphate | 5 | 20 |
| distilled water | 75 | 300 |

Dip-Coating Procedure

1. The components of Table 11 were dissolved in distilled water at about 25° C.

2. Cotton fabric of jersey knit was dip-coated with the first solution at a liquor ratio of 1:4 for about 30 minutes at about 25° C.

3. The wet fabric was padded and dried at about 80° C. for about 60 minutes.

4. The dried fabric was rinsed with water, padded and then tumble dried to remove absorbed water.

5. Zinc acetate dihydrate as a transition metal salt was dissolved in distilled water according to the amount listed in the following Table 12 to form a second solution.

TABLE 12

| Materials | Amount (%) | Amount (g) |
|---|---|---|
| Cotton fabric from step 4 | Liquor Ratio 1:6 | 72 |
| zinc acetate dihydrate | 6 | 24 |
| distilled water | 94 | 376 |

6. The cotton fabric from step 4 was further dip-coated with the second solution at a liquor ratio of 1:6 for about 30 minutes.

7. The wet fabric was padded and dried at about 80° C. for about 30 minutes.

8. The dried fabric was rinsed with water, padded and then tumble dried to remove absorbed water.

The coating weighed from approximately 11.6 to 16.3 g/$m^2$ upon applying the finish to fabric after drying.

Alternative Example 6—Formulation 5 on Cotton Fabric

9. Alternatively, copper acetate monohydrate as a transition metal salt was dissolved in distilled water according to the amount listed in the following Table 13 to form a second solution.

TABLE 13

| Materials | Amount (%) | Amount (g) |
|---|---|---|
| cotton fabric from step 4 | liquor ratio 1:6 | 72 |
| copper acetate monohydrate | 1 | 4 |
| distilled water | 99 | 396 |

10. The cotton fabric from example 6, step 4 was further dip-coated with the second solution at a liquor ratio of 1:6 for about 30 minutes.
11. The wet fabric was padded and dried at about 80° C. for about 30 minutes.
12. The dried fabric was rinsed with water, padded and then tumble dried to remove absorbed water.
13. Zinc acetate dihydrate as a transition metal salt was dissolved in distilled water according to the amount listed in the following Table 14 to form a third solution.

TABLE 14

| Materials | Amount (%) | Amount (g) |
|---|---|---|
| Cotton fabric from step 12 | Liquor Ratio 1:5 | 72 |
| zinc acetate dihydrate | 4 | 16 |
| distilled water | 96 | 384 |

14. The cotton fabric from step 12 was further dip-coated with the third solution at a liquor ratio of 1:5 for about 30 minutes.
15. The wet fabric was padded and dried at about 80° C. for about 30 minutes.
16. The dried fabric was rinsed with water, padded and then tumble dried to remove absorbed water.
The coating weighed from approximately 14.0 to 15.9 g/$m^2$ upon applying the finish to fabric after drying.

Example 7—Formulation 6 for Cotton-Blended Fabric

Table 15 below provides a first solution of the formulation 6 for dip-coating of cotton-blended fabric comprising 5% spandex and 95% cotton, and/or fabric comprising 30% polyester and 70% cotton.

TABLE 15

| Materials | Amount (%) | Amount (g) |
|---|---|---|
| cotton-blended fabric | liquor ratio 1:5 | 29-100 |
| bactericidal and virucidal agents of formula (I) comprising the substituent of formula (II) | 2 | 4-11 |
| 1,2,3,4-butanetetracarboxylic acid | 10 | 20-55 |
| cyanamide (50% wt aqueous solution) | 8 (4% solid content) | 16-44 |
| ammonium dihydrogen phosphate | 5 | 10-27.5 |
| distilled water | 75 | 150-412.5 |

Dip-Coating Procedure

1. The components of Table 15 were dissolved in distilled water at about 25° C.
2. Cotton-blended fabrics including fabric comprising 5% spandex and 95% cotton, and/or fabric comprising 30% polyester and 70% cotton was dip-coated with the first solution at a liquor ratio of 1:5 for about 30 minutes at about 25° C.
3. The wet fabric was padded and dried at about 80° C. for about 60 minutes.
4. The dried fabric was rinsed with water, padded and then tumble dried to remove absorbed water.
5. Zinc acetate dihydrate as a transition metal salt was dissolved in distilled water according to the amount listed in the following Table 16 to form a second solution of the formulation.

TABLE 16

| Materials | Amount (%) | Amount (g) |
|---|---|---|
| cotton-blended fabric from step 4 | liquor ratio 1:5 | 29-100 |
| zinc acetate dihydrate | 6 | 12-33 |
| distilled water | 94 | 188-517 |

6. The cotton-blended fabric from step 4 was further dip-coated with the second solution at a liquor ratio of 1:5 for about 30 minutes.
7. The wet fabric was padded and dried at about 80° C. for about 30 minutes.
8. The dried fabric was rinsed with water, padded and then tumble dried to remove absorbed water.
The coating weighed from approximately 15.5 to 22.2 g/$m^2$ upon applying the finish to fabric after drying.

Alternative Example 7—Formulation 7 on Cotton-Blended Fabric

9. Alternatively, copper acetate monohydrate as a transition metal salt was dissolved in distilled water according to the amount listed in the following Table 17 to form a second solution.

TABLE 17

| Materials | amount (%) | Amount (g) |
|---|---|---|
| cotton-blended fabric from step 4 | liquor ratio 1:5 | 100 |
| copper acetate monohydrate | 1 | 5.5 |
| distilled water | 99 | 544.5 |

10. The cotton-blended fabric from example 7, step 4 was further dip-coated with the second solution at a liquor ratio of 1:5 for about 30 minutes.
11. The wet fabric was padded and dried at about 80° C. for about 30 minutes.
12. The dried fabric was rinsed with water, padded and then tumble dried to remove absorbed water.
13. Zinc acetate dihydrate as a transition metal salt was dissolved in distilled water according to the amount listed in the following Table 18 to form a third solution of the formulation.

TABLE 18

| Materials | Amount (%) | Amount (g) |
|---|---|---|
| Cotton-blended fabric from step 12 | Liquor Ratio 1:5 | 100 |
| Zinc Acetate Dihydrate | 4 | 22 |
| Distilled Water | 94 | 528 |

14. The cotton-blended fabric from step 12 was further dip-coated with the third solution at a liquor ratio of 1:5 for about 30 minutes.
15. The wet fabric was padded and dried at about 80° C. for about 30 minutes.

16. The dried fabric was rinsed with water, padded and then tumble dried to remove absorbed water.

The coating weighed from approximately 25.6 to 27.4 g/$m^2$ upon applying the finish to fabric after drying.

Example 8—Formulation 8 on Cotton Fabric

Table 19 below provides a first solution of the formulation 8 for dip-coating a cotton fabric of jersey knit.

TABLE 19

| Materials | Amount (%) | Amount (g) |
|---|---|---|
| cotton fabric - jersey knit | liquor ratio 1:4 | 40-45 |
| bactericidal and virucidal agent of formula (I) comprising the substituent of formula (III), $R_4 = CH_3$ | 2-8 | 4.4-20 |
| 1,2,3,4-butanetetracarboxylic acid | 7-10 | 15.4-25 |
| cyanamide (50% wt aqueous solution) | 8 (4% solid content) | 17.6-20 |
| ammonium dihydrogen phosphate | 5 | 11-12.5 |
| distilled water | 69-78 | 171.6-187.5 |

Dip-Coating Procedure

1. The components of Table 19 were dissolved in distilled water at about 25° C.
2. Cotton fabric of jersey knit be dip-coated with the first solution at a liquor ratio of 1:4 for about 30 minutes at about 25° C.
3. The wet fabric was padded and dried at about 80° C. for about 60 minutes.
4. The dried fabric was rinsed with water, padded and then tumble dried to remove absorbed water.

The coating weighed from approximately 13.6 to 18.8 g/$m^2$ upon applying the finish to fabric after drying.

Alternative Example 8—Formulation 9 on Cotton Fabric

5. Alternatively, zinc acetate dihydrate as a transition metal salt was dissolved in distilled water according to the amount listed in the following Table 20 to form a second solution.

TABLE 20

| Materials | Amount (%) | Amount (g) |
|---|---|---|
| cotton fabric from step 4 | liquor ratio 1:5 | 40 |
| zinc acetate dihydrate | 6 | 13.2 |
| distilled water | 94 | 206.8 |

6. The cotton fabric from example 8, step 4 was further dip-coated with the second solution at a liquor ratio of 1:5 for about 30 minutes.
7. The wet fabric was padded and dried at about 80° C. for about 30 minutes.
8. The dried fabric was rinsed with water, padded and then tumble dried to remove absorbed water.

The coating weighed from approximately 11.6 to 14.2 g/$m^2$ upon applying the finish to fabric after drying.

Example 9—Formulation 10 on Cotton-Polyester Blended Fabric

Table 21 below provides a first solution of the formulation 10 for dip-coating a cotton-polyester blended fabric comprising 30% polyester and 70% cotton.

TABLE 21

| Materials | Amount (%) | Amount (g) |
|---|---|---|
| cotton-polyester blended fabric comprising 30% polyester and 70% cotton | liquor ratio 1:4 | 100 |
| bactericidal and virucidal agent of formula (I) comprising the substituent of formula (III) where $R_4 = H$ | 2 | 11 |
| 1,2,3,4-butanetetracarboxylic acid | 7 | 38.5 |
| cyanamide (50% wt aqueous solution) | 8 (4% solid content) | 44 |
| ammonium dihydrogen phosphate | 5 | 27.5 |
| distilled water | 78 | 429 |

Dip-Coating Procedure

1. The components of Table 21 were dissolved in distilled water at about 25° C.
2. Cotton-polyester blended fabric comprising 30% polyester and 70% cotton was dip-coated with the first solution at a liquor ratio of 1:4 for about 30 minutes at about 25° C.
3. The wet fabric was padded and dried at about 80° C. for about 60 minutes.
4. The dried fabric was rinsed with water, padded, and then tumble dried to remove absorbed water.
5. Zinc acetate dihydrate as a transition metal salt was dissolved in distilled water according to the amount listed in the following Table 22 to form a second solution of the formulation.

TABLE 22

| Materials | Amount (%) | Amount (g) |
|---|---|---|
| cotton-polyester blended fabric from step 4 | liquor ratio 1:5 | 100 |
| zinc acetate dihydrate | 6 | 33 |
| distilled water | 94 | 517 |

6. The cotton-polyester blended fabric from step 4 was further dip-coated with the second solution at a liquor ratio of 1:5 for about 30 minutes.
7. The wet fabric was padded and dried at about 80° C. for about 30 minutes.
8. The dried fabric was rinsed with water, padded and then tumble dried to remove absorbed water.

The coating weighed from approximately 15.9 to 19.0 g/$m^2$ upon applying the finish to fabric after drying.

Example 10—Formulation 11 Cotton-Polyester Blended Fabric

Table 23 below provides a first solution of the formulation 11 for dip-coating a cotton-polyester blended fabric comprising 30% polyester and 70% cotton.

TABLE 23

| Materials | Amount (%) | Amount (g) |
|---|---|---|
| cotton-polyester blended fabric comprising 30% polyester and 70% cotton | liquor ratio 1:4 | 40 |
| bactericidal and virucidal agents of formula (I) comprising the substituent of formula (III), $R_4$ = H | 8 | 17.6 |
| 1,2,3,4-butanetetracarboxylic acid | 7 | 15.4 |
| cyanamide (50% wt aqueous solution) | 8 (4% solid content) | 16.6 |
| ammonium dihydrogen phosphate | 5 | 11 |
| distilled water | 72 | 160 |

Dip-Coating Procedure

1. The components of Table 23 were dissolved in distilled water at about 25° C.
2. Cotton-polyester blended fabric comprising 30% polyester and 70% cotton was dip-coated with the first solution at a liquor ratio of 1:4 for about 30 minutes at about 25° C.
3. The wet fabric was padded and dried at about 80° C. for about 60 minutes.
4. The dried fabric was rinsed with water, padded and then tumble dried to remove absorbed water.
5. Zinc acetate dihydrate as a transition metal salt was dissolved in distilled water according to the amount listed in the following Table 24 to form a second solution.

TABLE 24

| Materials | Amount (%) | Amount (g) |
|---|---|---|
| cotton-polyester blended fabric from step 4 | liquor ratio 1:5 | 40 |
| zinc acetate dihydrate | 6 | 13.2 |
| distilled water | 94 | 206.8 |

6. The cotton-polyester-blended fabric from step 4 was further dip-coated with the second solution at a liquor ratio of 1:5 for about 30 minutes.
7. The wet fabric was padded and dried at about 80° C. for about 30 minutes.
8. The dried fabric was rinsed with water, padded and then tumble dried to remove absorbed water.

The coating weighed from approximately 9.1 to 10.2 g/$m^2$ upon applying the finish to fabric after drying.

Example 11—Formulation 12 on Wool Fabric

Table 24 below provides a first solution of the formulation 12 for dip-coating a wool fabric of rib stitch knit.

TABLE 25

| Materials | Amount (%) | Amount (g) |
|---|---|---|
| Wool fabric - rib stitch | liquor ratio 1:6 | 83 |
| bactericidal and virucidal agents of formula (I) comprising the substituent of formula (II) | 4 | 31.6 |
| 1-Propanaminium, N,N-dimethyl-3-oxo-N-(3-sulfopropyl)-3-[[3-(triethoxysilyl)propyl]amino]-, inner salt (27% wt aqueous solution) | 28 | 234 |
| (3-Glycidyloxypropyl)trimethoxysilane | 1 | 31.6 |
| Bis[(3-(trimethoxysilyl)propyl)amine | 4 | 6.3 |
| (3-Trimethoxysilylpropyl)diethylenetriamine | 4, 90% purity | 35.1 |
| copper acetate monohydrate | 4 | 31.6 |
| distilled water | 56 | 470.3 |
| Hydrochloric Acid (37% w/w aqueous solution) | | |

Dip-Coating Procedure

1. The components of Table 24 except hydrochloric acid (37% w/w aqueous solution) were dissolved in distilled water at about 25° C.
2. The solution was cooled to 0° C., and hydrochloric acid (37% w/w aqueous solution) was added until pH=3.2-3.4. Then the solution was warmed to room temperature.
3. Wool fabric was pre-conditioned at 25° C. and 95% relative humidity in a climatic chamber for at least 4 hours.
4. Wool fabric from step 3 was dip-coated with the first solution at a liquor ratio of 1:6 for about 30 minutes at about 25° C.
5. The wet fabric was padded and dried at about 130° C. for about 30 minutes.
6. The dried fabric was rinsed with water, and then tumble dried to remove absorbed water.

The coating weighed from approximately 7.2 to 165.0 g/$m^2$ upon applying the finish to fabric after drying.

Example 12—Formulation 13 on Wool Fabric

Table 26 below provides a first solution of the formulation 13 for dip-coating a wool fabric of rib stitch knit.

TABLE 26

| Materials | Amount (%) | Amount (g) |
|---|---|---|
| Wool fabric - rib stitch | liquor ratio 1:5 | 156 |
| bactericidal and virucidal agents of formula (I) comprising the substituent of formula (II) | 5 | 53.5 |
| 1-Propanaminium, N,N-dimethyl-3-oxo-N-(3-sulfopropyl)-3-[[3-(triethoxysilyl)propyl]amino]-, inner salt (33% wt aqueous solution) | 14 | 162 |
| (3-Glycidyloxypropyl)trimethoxysilane | 1 | 10.7 |
| Bis[(3-(trimethoxysilyl)propyl)amine | 5 | 53.5 |
| (3-Trimethoxysilylpropyl)diethylenetriamine | 5, 90% purity | 59.5 |
| copper acetate monohydrate | 5 | 53.5 |
| distilled water | 67 | 792 |
| Hydrochloric Acid (37% w/w aqueous solution) | | |

Dip-Coating Procedure

1. The components of Table 25 except hydrochloric acid (37% w/w aqueous solution) were dissolved in distilled water at about 25° C.
2. The solution was cooled to 0° C., and hydrochloric acid (37% w/w aqueous solution) was added until pH=3.2-3.4. Then the solution was warmed to room temperature.
3. Wool fabric was pre-conditioned at 25° C. and 95% relative humidity in a climatic chamber for at least 4 hours.
4. Wool fabric from step 3 was dip-coated with the first solution at a liquor ratio of 1:5 for about 30 minutes at about 25° C.
5. The wet fabric was padded and dried at about 130° C. for about 30 minutes.

6. Zinc acetate dihydrate as a transition metal salt was dissolved in distilled water according to the amount listed in the following Table 26 to form a second solution.

TABLE 27

| Materials | Amount (%) | Amount (g) |
|---|---|---|
| Wool fabric from step 5 | liquor ratio 1:7 | 156 |
| zinc acetate dihydrate | 4 | 48 |
| distilled water | 96 | 1152 |

7. The wool fabric from step 5 was further dip-coated with the second solution at a liquor ratio of 1:7 for about 30 minutes.

8. The wet fabric was padded and dried at about 80° C. for about 30 minutes.

9. The dried fabric was rinsed with water, and then tumble dried to remove absorbed water.

The coating weighed from approximately 61.9 to 90.7 g/$m^2$ upon applying the finish to fabric after drying.

The tables below summarize the bactericidal and virucidal activities of Example 2 (Table 28), Example 3 (Table 29), Example 4 (Table 30), Example 5 (Table 31), Example 6 and Alternative Example 6 (Table 32), Example 7 and Alternative Example 7 (Table 33), Example 8 and Alternative Example 8 (Table 34), Example 9 (Table 35), Example 10 (Table 36), Example 11 (Table 39) and Example 12 (Table 40).

Table 37 below summarizes the deodorizing performance of Example 7.

Table 38 below summarizes discoloration grades using grey scale grading against the original finish of cotton-based fabric upon treatment with the present invention.

TABLE 28

| Test Article | Concentration of Zinc Acetate Dihydrate (%) | Test Strain | Contact Time (h) | Virucidal Activity (%) | Test Standard |
|---|---|---|---|---|---|
| Example 2 | 0.025 | Influenza | 2 | 99.998 | ISO 18184- |
| | 0.1 | Virus H1N1 | | 99.84 | 2019 |
| | 0.2 | A/WSN/33 | | 99.84 | |
| | 0.005 | | | 99.98 | |

TABLE 29

| Test Article | Test Strain | Contact Time (h) | Bactericidal Activity (%) | Bactericidal Activity after 30 Laundry Cycles (%)* | Test Standard |
|---|---|---|---|---|---|
| Example 3 | *Staphylococcus aureus* | 24 | 99.9 | 99.9 | AATCC 100-2019 |
| | *Klebsiella pneumonia* | | 99.9 | 99.9 | |

*Method: AATCC - LP1: 30 cycles of machine wash at 105° F., normal cycle, tumble dry - delicate

TABLE 30

| | | | Virucidal Activity (%) | | | |
|---|---|---|---|---|---|---|
| Test Article | Test Strain | Contact Time (h) | Before Laundry | After 10 Laundry Cycles* | After 30 Laundry Cycles* | Test Standard |
| Example 4 | Influenza Virus H1N1 A/PR/8/34 | 2 | 99.9 | >99.99 | 99.9 | ISO 18184 - 2019 |

*Method: 10 and 30 cycles of ISO 6330: 2012 (4 H) - machine hand wash

TABLE 31

| | | | | Virucidal Activity (%) | | |
|---|---|---|---|---|---|---|
| Test Article | Concentration of 1,2,3,4-Butanetetra-carboxylic Acid (%) | Test Strain | Contact Time (h) | Before Laundry | After 30 Laundry Cycles* | Test Standard |
| Example 5 | 4 | Influenza | 2 | 92.7 | 99.2 | ISO |
| | 10 | Virus | | 95.3 | 99.7 | 18184 - |
| | | H1N1 | | | | 2019 |
| | | A/PR/8/34 | | | | |

*Method: AATCC - LP1: 30 cycles of machine wash at 105° F., normal cycle, tumble dry - delicate

TABLE 32

| Test Article | Test Strain | Contact Time (h) | Virucidal/Fungicidal Activity (%) Before Laundry | After 30 Laundry Cycles* | Test Standard |
|---|---|---|---|---|---|
| Example 6 | *Aspergillus* | 48 | 99.32 | — | ISO |
| Alternative | *Niger* | | 99.28 | — | 13929-2 |
| example 6 | SARS-CoV-2 England/02/2020 | 2 | 98.6 | 99.97 | ISO 18184 - 2019 |

*Method: AATCC - LP1: 30 cycles of machine wash at 105° F., normal cycle, tumble dry - delicate

TABLE 33

| Test Article | | Test Strain | Contact Time (h) | Bactericidal/ Virucidal/ Fungicidal Activity (%) | Bactericidal/ Virucidal/ Fungicidal Activity after 30 Laundry Cycles (%)* | Test Standard |
|---|---|---|---|---|---|---|
| Example 7 | Bacteria | *Staphylococcus aureus* | 24 | 99.9 | 99.9 | AATCC |
| | | *Klebsiella pneumonia* | | 99.9 | 99.9 | 100-2019 |
| | Virus | H1N1 A/WSN/33 | 2 | 92.8 | — | ISO 18184 - 2019 |
| | | Human Coronavirus HCoV-NL63 | | 60.2 | 84.9 | |
| | Fungi | *Aspergillus Niger* | 48 | 63.7 | 57.3 | ISO 13929-2 |
| Alternative Example 7 | Virus | Human Coronavirus HCoV-NL63 | 2 | 99.4 | 98.2 | ISO 18184 - 2019 |
| | Fungi | *Aspergillus Niger* | 48 | 84.9 | 87.4 | ISO 13929-2 |

*Method: AATCC - LP1: 30 cycles of machine wash at 105° F., normal cycle, tumble dry - delicate

TABLE 34

| Test Article | Concentration of bactericidal and virucidal agent of formula (I) comprising the substituent of formula (III) where $R_4 = CH_3$ (%) | Concentration of 1,2,3,4-Butanetetra-carboxylic Acid (%) | Test Strain | Contact Time (h) | Virucidal/Fungicidal Activity (%) Before Laundry | After 30 Laundry Cycles* | Test Standard |
|---|---|---|---|---|---|---|---|
| Example 8 | 2 | 10 | Influenza | 2 | 99.99 | | ISO |
| | 4 | 10 | Virus H1N1 A/PR/8/34 | | 99.9998 | | 18184 - 2019 |
| | 4 | 10 | Influenza A | | 99.99 | | |
| | 8 | 10 | H3N2 Hong Kong/8/68 | | 99.9994 | | |
| | 2 | 10 | Human | | 78.5 | | |
| | 8 | 10 | Coronavirus HCoV-OC43 | | 95.4 | | |
| | 2 | 7 | Human Coronavirus HCoV-NL63 | | — | 93.7 | |
| Alternative Example 8 | 2 | 7 | *Aspergillus Niger* | 48 | 99.8 | — | ISO 13929-2 |

*Method: AATCC - LP1: 30 cycles of machine wash at 105° F., normal cycle, tumble dry - delicate

TABLE 35

| Test Article | Test Strain | Contact Time (h) | Fungicidal Activity (%) Before Laundry | After 30 Laundry Cycles* | Test Standard |
|---|---|---|---|---|---|
| Example 9 | *Aspergillus Niger* | 48 | 94.8 | 91.5 | ISO 13929-2 |

*Method: AATCC - LP1: 30 cycles of machine wash at 105° F., normal cycle, tumble dry - delicate

TABLE 36

| Test Article | Test Strain | Contact Time (h) | Virucidal Activity (%) Before Laundry | After 30 Laundry Cycles* | Test Standard |
|---|---|---|---|---|---|
| Example 10 | Influenza Virus H1N1 A/PR/8/34 | 2 | 99.6 | 95.9 | ISO 18184 - 2019 |

*Method: AATCC - LP1: 30 cycles of machine wash at 105° F., normal cycle, tumble dry - delicate

TABLE 37

| Test Article | Odorant | Contact Time (h) | Deodorizing Performance (%) Before Laundry | After 30 Laundry Cycles* | Test Standard |
|---|---|---|---|---|---|
| Example 7 | Acetic acid | 2 | 96 | 97 | ISO 17299: 2 - 2014 |
| | Isovaleric acid | | 90 | 98 | ISO 17299: 3 - 2014 |

*Method: AATCC - LP1: 30 cycles of machine wash at 105° F., normal cycle, tumble dry - delicate

TABLE 38

| Cotton-based Fabric | | Color | Discoloration grades using grey scale grading against the original finish of cotton-based fabric upon treatment with the present invention per ISO 105-A02* |
|---|---|---|---|
| Examples 2, 3, 4 | Cotton Jersey Knit | Cream White | 2.5 |
| | | Black | 4.8 |
| | | Blue | 4.4 |
| Example 7 | 5% Spandex and 95% Cotton | Cream White | 4.0 |
| | | Black | 4.7 |
| | | Green | 4.4 |
| | 30% Polyester and 70% Cotton | Cream White | 3.4 |
| | | Black | 4.7 |
| | | Green | 4.3 |

*Grade of 5 - little to no discoloration; grade of 1 - severe discoloration

TABLE 39

| Test Article | Test Strain | Contact Time (h) | Bactericidal Activity (%) | Bactericidal Activity after 30 Laundry Cycles (%)* | Test Standard |
|---|---|---|---|---|---|
| Example 11 | *Staphylococcus aureus* | 24 | 99.9 | 99.9 | AATCC 100-2019 |
| | *Klebsiella pneumonia* | | 99.9 | 99.9 | |

*Method: ISO 6330-4H: 10 cycles of stimulated hand wash at 40° C., flat dry

TABLE 40

| Test Article | Test Strain | Contact Time (h) | Virucidal Activity (%) Before Laundry | After 30 Laundry Cycles* | Test Standard |
|---|---|---|---|---|---|
| Example 12 | Influenza Virus H1N1 A/PR/8/34 | 2 | ≥99.99 | 99.59 | ISO 18184 - 2019 |
| | Human coronavirus 229E (ATCC VR-740) | | 99.92 | 99.75 | |

*Method: ISO 6330-4H: 10 cycles of stimulated hand wash at 40° C., flat dry

Figure 2:
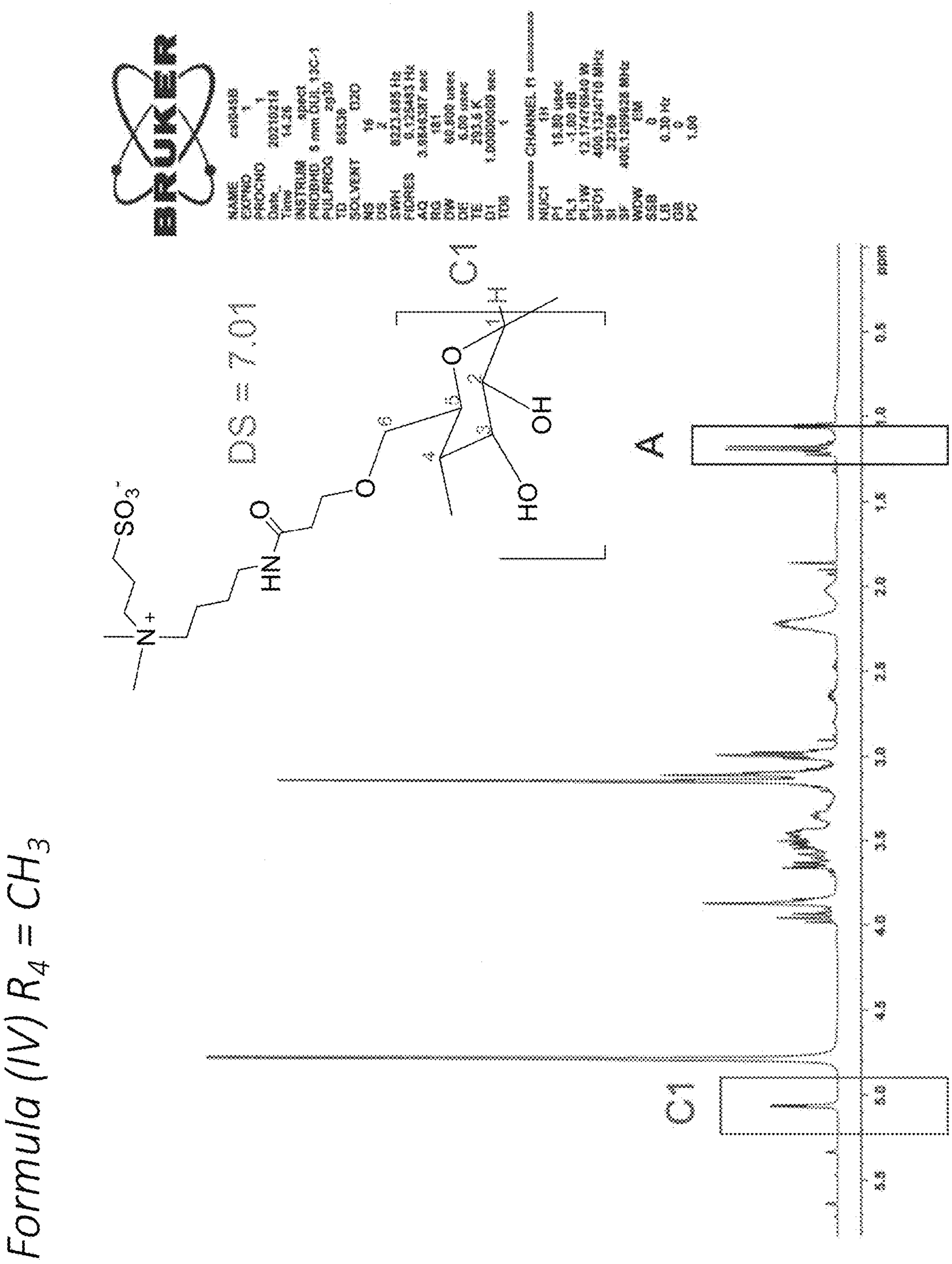
FIG. 2 shows an NMR spectrum for a compound including Formula IV where $R_4$=$CH_3$.
Figure 3:
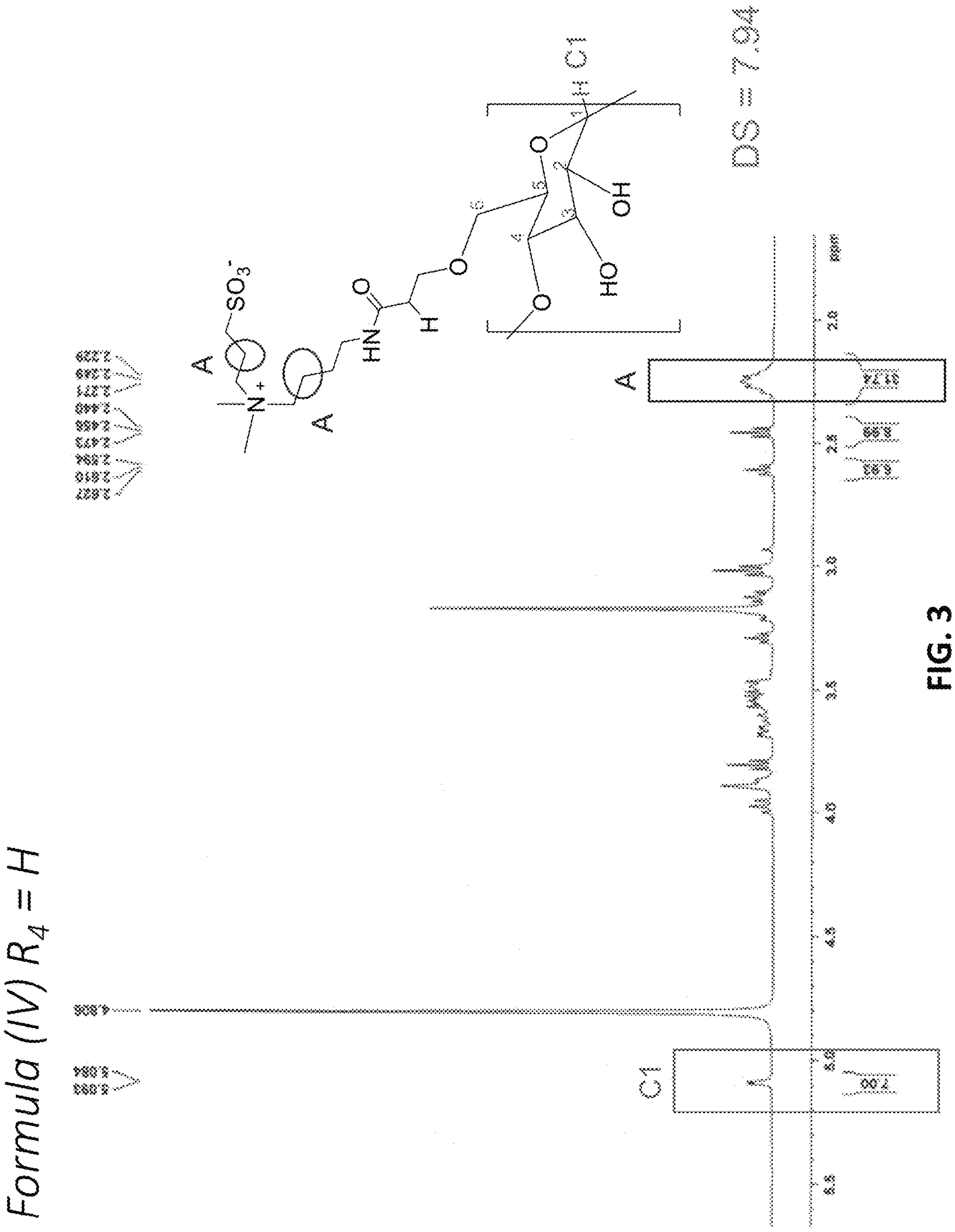
FIG. 3 shows an NMR spectrum for a compound including Formula IV where $R_4$=H.

Substitution of Groups Group (II), (III), (IV), (V), (VI) or (VII) at $R_1$, $R_2$ and/or $R_3$ FIGS. 1-3 show the degree of substitution determined by NMR for several of the substituents. For substitution using Formula (II), the sums of $R_1$, $R_2$ and $R_3$ equals to 1 (i.e. $n\times(R_1+R_2+R_3)=1$, where n=7). For substitution using Formula (IV), where $R_4$=$CH_3$, m=3, $n\times(R_1+R_2+R_3)=7.01$, where n=7; and when $R_4$=H, m=3, $n\times(R_1+R_2+R_3)=7.94$. These results demonstrate that, some embodiments, only partially substitution may be used to create the compounds having the antibacterial and antiviral activity of the present invention.

INDUSTRIAL APPLICABILITY

The present invention is applicable in textile and garments which require antibacterial and antiviral functions with durability and launderability. The finishes may be applied to fabric prior to fabrication into clothing or other uses; alternatively, they may be applied to finished articles of clothing, medical apparel, surgical masks, wound dressings, etc. Alternatively, the kits of the present invention may be sold to consumers for home application to clothing or fabrics.

The invention claimed is:

1. A kit for a launderable bactericidal and virucidal fabric finish formulation for home application comprising:

a first component having a bactericidal and virucidal agent represented by formula (I):

(I)

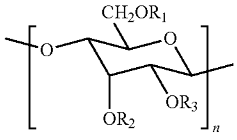

, wherein n is 7; each of $R_1$, $R_2$, and $R_3$ is jointly or independently selected from H or one of the following groups:

(II)

$CH_2CH_2SO_3^-Na^+$;

(III)

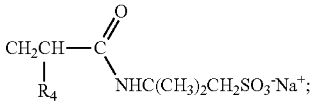

(IV)

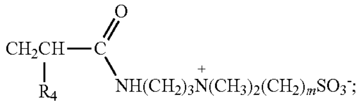

(V)

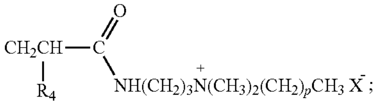

X = F, Cl, Br, I (VI)

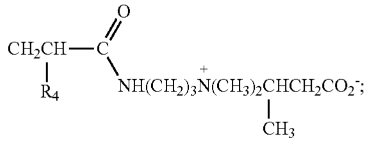

(VII)

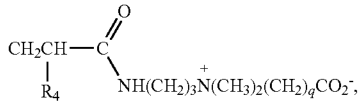

wherein $R_4$ is selected from $CH_3$ or H; m is an integer from 2 to 10; p is an integer from 9 to 15; q is an integer from 2 to 10; and a second component comprising:

one or more crosslinkers; and/or one or more catalysts;

a third component comprising one or more transition metal salts;

wherein at least one of $R_1$, $R_2$, and $R_3$ includes a Group selected from Group (II), (III), (IV), (V), (VI) or (VII);

and wherein the kit demonstrates bactericidal and virucidal activity as a fabric finish.

2. The kit of claim 1, wherein the one or more crosslinkers is/are selected from citric acid, tricarballylic acid, 1,2,3,4-butanetetracarboxylic acid, 1,2,4,5-benzenetetracarboxylic acid, cis,cis,cis,cis-1,2,3,4-cyclopentanetetracarboxylic acid, 1,3,5-cyclohexanetricarboxylic acid, 1,2,3,4,5,6-cyclohexanehexacarboxylic acid, ethylenediaminetetraacetic acid, 1-Propanaminium, N,N-dimethyl-3-oxo-N-(3-sulfopropyl)-3-[[3-(triethoxysilyl)propyl]amino]-, inner salt, (3-Glycidyloxypropyl)trimethoxysilane, Bis[(3-(trimethoxysilyl)propyl)amine, and/or (3-Trimethoxysilylpropyl)diethylenetriamine.

3. The kit of claim 1, wherein the one or more catalysts is/are selected from sodium dihydrogen phosphate, sodium hydrogen phosphate, sodium phosphate, ammonium dihydrogen phosphate, sodium hypophosphite, cyanamide, dicyandiamide, sodium hydrogen cyanamide, disodium cyanamide, sodium hydroxide, and/or hydrochloric acid.

4. The kit of claim 1, wherein the one or more transition metal salts comprise one or more of zinc acetate, zinc acetate dihydrate, zinc gluconate, copper (II) acetate, copper (II) acetate hydrate, and copper (II) gluconate.

5. A method of preparing a launderable bactericidal and virucidal fabric for home application comprising:

providing a first solution comprising a first and a second component at a liquor ratio of approximately 1:4 to 1:40 wherein the first component comprises a bactericidal and virucidal agent represented by formula (I):

a first component having a bactericidal and virucidal agent represented by formula (I):

(I)

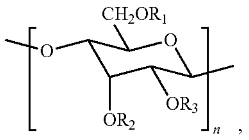

wherein n is 7; each of $R_1$, $R_2$, and $R_3$ is jointly or independently selected from H or one of the following groups:

(II)

$CH_2CH_2SO_3^-Na^+$;

(III)

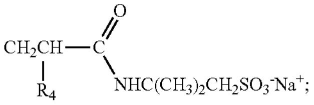

(IV)

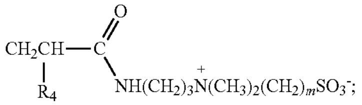

(V)

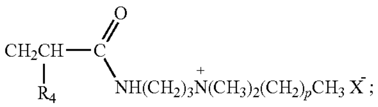

X = F, Cl, Br, I (VI)

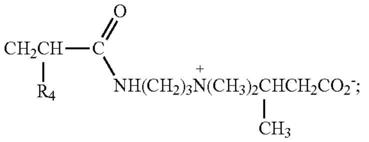

(VII)

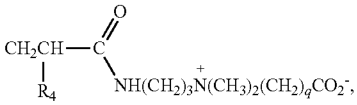

wherein at least one of $R_1$, $R_2$, and $R_3$ is selected from Group (II), (III), (IV), (V), (VI) or (VII);

wherein $R_4$ is selected from $CH_3$ or H; m is an integer from 2 to 10; p is an integer from 9 to 15; q is an integer from 2 to 10; and wherein the second component comprises:

one or more crosslinkers; and/or one or more catalysts;

dip-coating a fabric in the first solution;

drying and/or curing the dip-coated fabric;

providing a second solution comprising a third component at a liquor ratio of 1:4 to 1:40 wherein the third component is one or more transition metal salts;

dip-coating the fabric in the second solution.

6. The method of claim 5, wherein the liquor ratio is 1:34 to 1:40 for the first or second solution.

7. The method of claim 5, wherein the liquor ratio is 1:4 to 1:5 for the first or second solution.

8. The method of claim 5 wherein the dip-coating in the first or second solution is for about 5 to 60 minutes at about 25 to 80° C.

9. The method of claim 5, where the drying and/or curing following dip-coating in the first solution is at about 60 to 180° C. for about 5 to 60 minutes;

after drying and/or curing said dip-coated fabric, washing the fabric with water and then tumble drying the washed fabric for about 30 to 60 minutes at about 60 to 90° C.

10. The method of claim 5, further comprising drying and/or curing the dip-coated fabric at about 60 to 180° C. for about 5 to 60 minutes following dip-coating in the second solution;

after drying and/or curing said dip-coated fabric, washing the fabric with water and then tumble drying the washed fabric for about 30 to 60 minutes at about 60 to 90° C.

11. A fabric comprising a launderable bactericidal and virucidal fabric finish prepared by the method according to claim 5 having bactericidal, fungicidal, and virucidal activity of at least 90%, and/or deodorizing performance of at least 90%.

12. The fabric of claim 11, wherein the fabric has an increment in coating weight of 6.5 to 165.0 g/m$^2$.

13. A kit for a launderable bactericidal and virucidal fabric finish formulation comprising:

a first component having a bactericidal and virucidal agent represented by formula (I):

(I)

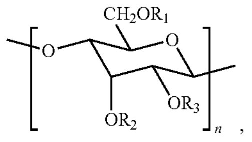

wherein n is 7; $R_1$, $R_2$, and $R_3$ are jointly or independently selected from H or one of the following groups:

(II)

$CH_2CH_2SO_3^-Na^+$;

-continued (III)

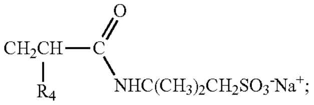

(IV)

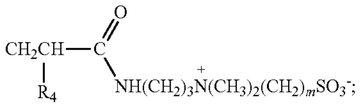

(V)

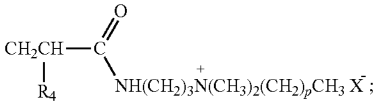

X = F, Cl, Br, I (VI)

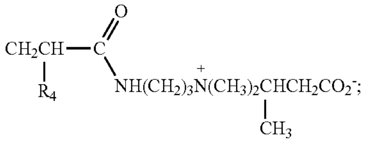

(VII)

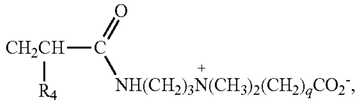

wherein at least one of $R_1$, $R_2$, and $R_3$ includes a Group selected from Group (II), (III), (IV), (V), (VI) or (VII);

wherein $R_4$ is selected from $CH_3$ or H; m is an integer from 2 to 10; p is an integer from 9 to 15; q is an integer from 2 to 10; and a second component comprising:

one or more crosslinkers; and/or one or more catalysts; and a third component including a transition metal salt.

14. A method of preparing a launderable bactericidal and virucidal fabric comprising:

providing a first solution comprising the first and second components of claim 13 at a liquor ratio of approximately 1:4 to 1:40;

dip-coating a fabric in the first solution;

providing a second solution including the third component;

dip-coating the fabric in the second solution; and drying and/or curing the dip-coated fabric.

* * * * *